C. H. MOORE.
Overflow and Trap for Basins.
No. 207,197. Patented Aug. 20, 1878.
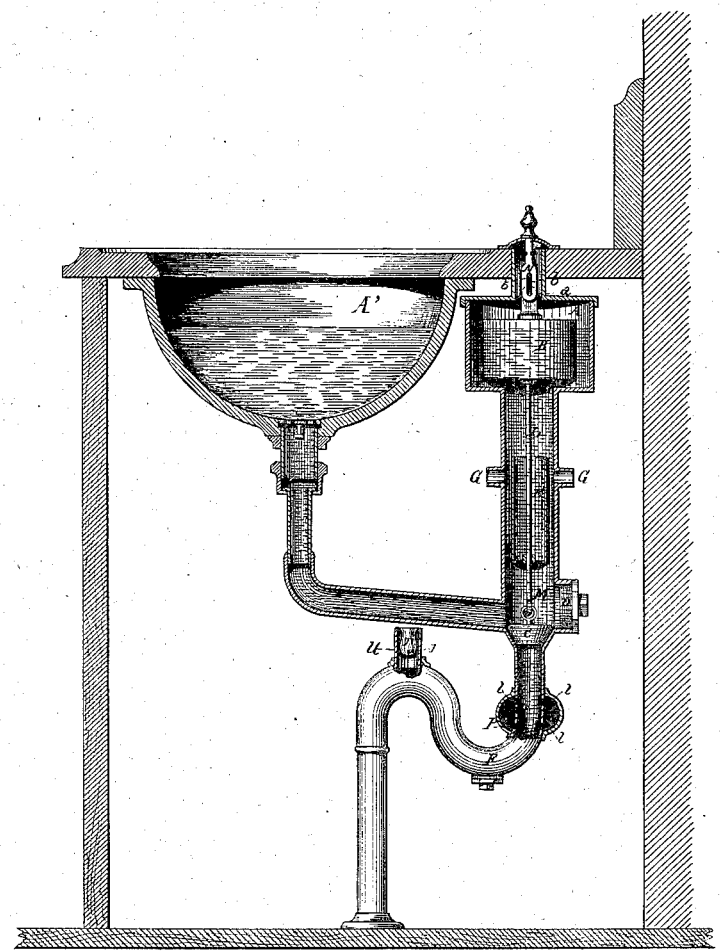
Witnesses.
Wm Schwanhausser
R. Smith.
Inventor.
Chas. H. Moore

UNITED STATES PATENT OFFICE.

CHARLES H. MOORE, OF YONKERS, NEW YORK.

IMPROVEMENT IN OVERFLOW AND TRAP FOR BASINS.

Specification forming part of Letters Patent No. 207,197, dated August 20, 1878; application filed June 27, 1878.

*To all whom it may concern:*

Be it known that I, CHARLES H. MOORE, of Yonkers, in the county of Westchester and State of New York, have invented a new and useful Improvement in Basin and Bath Valve Overflow and Trap, of which the following is a specification:

The object of my invention is to provide a means of preventing a basin or bath-tub from overflowing without the use of an overflow-pipe, in connection with a solid plug-valve to prevent odors escaping from the waste-pipe, and a means of resupplying the trap should it get siphoned.

A' represents the basin, showing the manner the valve and float chamber are attached. A represents the float-chamber, which can be cast on valve-chamber or secured by means of a coupling. B is a float operating in chamber A upon spindles L and N, of sufficient buoyancy to float the plug-valve C from its socket should water increase in the basin above a desired height. b is an opening in the upper fastening of float to permit spindle N to slide in. N is the upper spindle, so arranged that when the said spindle is at rest and the plug-valve is in its socket the bottom of said spindle is far enough above the top of float B to permit the float to buoy the plug-valve C from its socket (in case of too much water entering the basin) without lifting spindle N. Spindle N is also provided with grooves to support and keep the plug-valve C from its socket when necessary and a pin that secures it in the upper fastening b of float. E is a vessel upon the spindle below the float B, which is filled in the act of filling the basin. Said vessel is provided with small holes in the bottom.

When the plug-valve C is up, and instantly after the basin has emptied, the vessel is left nearly full and leaks out gradually, thus securing a supply to the trap and keeping the water-seal at its standard. This vessel or water-retainer could be made on the chamber or placed anywhere above the trap.

C is a solid plug-valve, (can be made of any suitable material,) intended to remain in its socket, excepting when the basin is being emptied. D is an opening in the valve-chamber to afford easy access to the valve to clean it. G G are inlets in the chamber for cocks should it be desirable to supply basin or bath from the bottom. F is a trap secured to the basin-valve, with a chamber, P, made on it below the water-line on the vertical pipe, forming the first bend, known as the "water-seal." This chamber can be made of any suitable form, or could be made to fill the space between the vertical inlet-pipe and the top or exhaust end. Said chamber P is supplied through small apertures l l, as shown in the trap proper, placed in a manner to admit but little circulation, if any, and to prevent sediment from entering the chamber. Said chamber can be supplied by a slot in the trap proper. It is intended as an auxiliary to make an apartment still more secure against the siphonage of the trap and the consequent influx of sewer-gas. It sometimes happens that a trap is siphoned from some cause other than the emptying of the basin to which it is connected. In this case water would gradually leak through apertures l l into the trap and make a perfect water-seal. Said apertures l l are placed on the trap at a part where the trap is least liable to get clogged, and consequently there is no possibility of the chamber being siphoned, as it would likely be at any time, and would surely be if it was placed in a position to be connected with the bottom and exhaust end and the trap should get clogged between the exhaust end and the bottom; but as a protection against siphonage I have placed a sensitive vacuum-valve (to be made of pure rubber) on the top bend of the trap, consisting of a rubber bulb, T, having slot I inclosed, and operating in chamber U. Said chamber is intended to be long enough, so that should the waste-pipe get clogged and fill with water it would contain enough compressed air to prevent water from touching rubber bulb T. The valve-chamber M has a conical-shaped outlet, into which the plug-valve C is fitted, or said valve-chamber can have a flat seat.

In operation, should water increase in the basin above the dotted lines shown, the float B would buoy the plug-valve C from its socket and permit the surplus water to escape to empty basin, lift the plug by the terminus of spindle N, and support it from its socket by grooves in spindle N, resting on the cap. The bulb T is pointing downward, and in case of any downward pressure the pipe would take air from the room and prevent the trap from getting siphoned. Said bulb is so constructed that any upward pressure would close it absolutely tight.

Having described my invention, what I claim as new, and desire to secure by Letters Patent, is—

1. The combination and arrangement, as herein shown and described, of the solid plug-valve C, valve-chamber M, having conical or flat seat, chamber A, and basin A', as set forth.

2. The combination, with the plug-valve C, spindle L, and float B in chamber A, of the spindle N, provided with means or opening b, to permit said float to have a certain amount of play without raising the handle.

3. In combination with the basin A', chamber A, valve-chamber M, plug-valve C, and spindle L, the float B, as and for the purpose described.

4. In combination with the chamber A, valve-chamber M, plug-valve C, and float B, the vessel E, secured upon the spindle L of the float, and provided with small outlets at or near the bottom, as and for the purpose set forth.

5. A combination of the retainer E, the trap F, and the chamber P.

6. The trap F, provided with water-receiver P, constructed substantially as shown and described, located below the level of the water-line on the pipe, forming the first bend or water-seal, and provided with small apertures l l for the ingress and egress of water, as and for the purpose set forth.

CHAS. H. MOORE.

Witnesses:
JOHN EWING,
WM. ARCHIBALD.